US010005891B2

(12) United States Patent
Jeong et al.

(10) Patent No.: US 10,005,891 B2
(45) Date of Patent: Jun. 26, 2018

(54) POLYMER FILMS

(71) Applicant: KOLON INDUSTRIES, INC., Gwacheon (KR)

(72) Inventors: Young-Han Jeong, Yongin (KR); So-Yeon Kwon, Yongin (KR); Hyun Namgoong, Yongin (KR); Seong-Hun Kim, Yongin (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days. days.

(21) Appl. No.: 14/894,365

(22) PCT Filed: May 27, 2014

(86) PCT No.: PCT/KR2014/004730
§ 371 (c)(1),
(2) Date: Nov. 26, 2015

(87) PCT Pub. No.: WO2014/193147
PCT Pub. Date: Dec. 4, 2014

(65) Prior Publication Data
US 2016/0096938 A1    Apr. 7, 2016

(30) Foreign Application Priority Data

May 27, 2013  (KR) .................. 10-2013-0059968
May 26, 2014  (KR) .................. 10-2014-0063171

(51) Int. Cl.
*B32B 7/02*  (2006.01)
*C08J 5/18*  (2006.01)
(Continued)

(52) U.S. Cl.
CPC .............. *C08J 5/18* (2013.01); *B60C 1/0008* (2013.01); *C09J 7/20* (2018.01); *C09J 7/25* (2018.01);
(Continued)

(58) Field of Classification Search
CPC ................ B60C 1/0008; C08J 5/18; C08J 2377/00–2377/02; C08J 2423/26;
(Continued)

(56) References Cited

U.S. PATENT DOCUMENTS

2005/0090616 A1    4/2005  Dias
2008/0047646 A1*   2/2008  Hong .............. B60C 1/0008
                                            152/510
(Continued)

FOREIGN PATENT DOCUMENTS

CN    1874890    12/2006
EP    2940058    11/2015
(Continued)

OTHER PUBLICATIONS

Wei-Fang Su, Principles of Polymer Design and Synthesis, 2013, Springer Berlin Heidelberg, Lecture Notes in Chemistry vol. 82, Chapter 2 p. 19.*

(Continued)

*Primary Examiner* — Maria Veronica Ewald
*Assistant Examiner* — Zachary M Davis
(74) *Attorney, Agent, or Firm* — Lex IP Meister, PLLC

(57) ABSTRACT

There is provided a polymer film which includes a base film layer having an absolute weight average molecular weight of 50,000 to 1,000,000 and an adhesive layer, and a method for manufacturing the polymer film. This film for a tire inner liner can endow an excellent gas barrier property even to tires having a relatively thin thickness so that weight of the tire can be reduced and fuel efficiency of automobiles can be improved. Further, the present film facilitates molding in a tire manufacturing process, and exhibits excellent adhesion force to a carcass layer while having excellent mechanical properties such as high durability and fatigue resistance together with excellent moldability.

11 Claims, 1 Drawing Sheet

(51) Int. Cl.
*B60C 1/00* (2006.01)
*C08L 77/00* (2006.01)
*C09J 161/12* (2006.01)

(52) U.S. Cl.
CPC ........ *C08J 2377/00* (2013.01); *C08J 2377/02* (2013.01); *C08J 2423/26* (2013.01); *C08J 2477/02* (2013.01); *C08L 77/00* (2013.01); *C09J 161/12* (2013.01); *C09J 2201/122* (2013.01); *C09J 2201/622* (2013.01); *C09J 2453/006* (2013.01); *C09J 2461/00* (2013.01); *C09J 2471/006* (2013.01); *C09J 2477/006* (2013.01)

(58) Field of Classification Search
CPC ........ C08J 2477/02; C09J 7/02; C09J 7/0282; C09J 161/12; C09J 2201/122; C09J 2201/622; C09J 2453/006; C09J 2461/00; C09J 2471/06; C09J 2477/06; C08L 77/00
See application file for complete search history.

(56) References Cited

U.S. PATENT DOCUMENTS

| | | | |
|---|---|---|---|
| 2008/0274355 A1* | 11/2008 | Hewel | C08G 69/265 428/402 |
| 2011/0024015 A1* | 2/2011 | Takahashi | B60C 1/0008 152/510 |
| 2012/0065340 A1 | 3/2012 | Malet | |
| 2012/0301652 A1* | 11/2012 | Kawaguchi | C08L 77/02 428/36.91 |
| 2013/0101821 A1* | 4/2013 | Jeon | B60O 5/14 428/215 |
| 2013/0192735 A1 | 8/2013 | Jeong | |
| 2013/0192736 A1 | 8/2013 | Song | |
| 2016/0032053 A1* | 2/2016 | Kato | C08G 69/40 428/220 |

FOREIGN PATENT DOCUMENTS

| | | | | |
|---|---|---|---|---|
| JP | 2006-225616 | 8/2006 | | |
| JP | 2010-241960 | 10/2010 | | |
| KR | 10-1997-0010474 | 6/1997 | | |
| KR | 10-2013-0035856 | 4/2013 | | |
| WO | 2007-111584 | 10/2007 | | |
| WO | WO 2012002750 A2 * | 1/2012 | | B60C 5/14 |
| WO | 2013-002603 | 1/2013 | | |

OTHER PUBLICATIONS

Machine Translation of WIPO Publication No. 2012/002750.*
International Standard ISO 307:2007, 5th edition, May 15, 2007, pp. 1-4, 23, 27, 31.*
Search Report & Written Opinion, Patent Cooperation Treaty, dated Sep. 1, 2014, Application No. PCT/KR2014/004730.

* cited by examiner

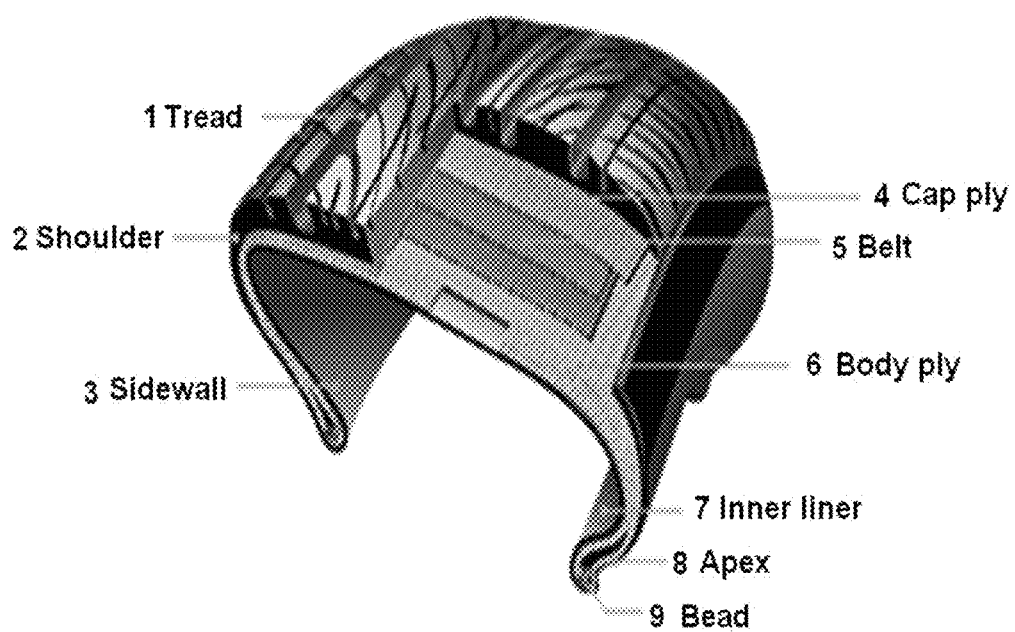

POLYMER FILMS

TECHNICAL FIELD

There is provided a polymer film, and more particularly a polymer film which endows an excellent gas barrier property to tires having a relatively thin thickness so that weight of the tire can be reduced when it is used for an inner liner film, improves fuel efficiency of automobiles, and has excellent mechanical properties such as high durability and fatigue resistance together with excellent moldability.

BACKGROUND OF THE INVENTION

A tire serves to withstand the load of automobiles, to reduce impact with a road surface, and to transfer a driving force or braking force of an automobile to the ground.

In general, the tire refers to a complex of fiber/steel/rubber and normally has a structure as shown in FIG. 1.

Tread (1): a portion that is in contact with the road surface. It should afford frictional force required for driving and braking, have good wear resistance, withstand external impact, and have minimal heat generation.

Body ply (or carcass) (6): a cord layer inside the tire. It should support a load, withstand impact, and have strong fatigue resistance to bending and stretching while the vehicle is running.

Belt (5): located between the body plies. It consists of steel wire in most cases, reduces external impact, and maintains a large area of contact of the ground to the surface of the tread to afford excellent vehicle running stability.

Side wall (3): a rubber layer between a part below a shoulder (2) and a bead (9). It serves to protect the inner body ply (6).

Inner liner (7): located inside the tire instead of a tube. It prevents air leakage to enable a pneumatic tire.

Bead 9: square or hexagonal wire bundle formed of rubber-coated steel wire. It serves to stabilize and fix the tire in a rim.

Cap ply (4): a special cord located on a belt of a radial tire for some passenger cars. It minimizes movement of the belt during automobile running.

Apex (8): triangular rubber filler used to minimize dispersion of the bead, reduce external impact to protect the bead, and prevent air inflow during molding.

Recently, a tubeless tire in which high pressure air of about 30~40 psi is injected without using a tube has become widely been used. In order to prevent inside air from leaking outside during automobile running, an inner liner having a high gas barrier property is disposed in an inner layer of the carcass.

Previously, a tire inner liner consisting mainly of rubber components such as butyl rubber or halobutyl rubber having relatively low air permeability was used, but in order to achieve a sufficient gas barrier property of the inner liner, the content of the rubber components and the thickness of the inner liner should be increased.

As the content of the rubber components and the thickness of the tire are increased, the total weight of the tire is increased, the fuel efficiency of automobiles may be lowered, air pockets may be generated between rubber in the inner surface of a carcass layer and an inner liner, or the shape or physical properties of the inner liner may be changed in a tire vulcanizing process or in an automobile running process.

Accordingly, various methods have been suggested to decrease the thickness and weight of the inner liner to increase fuel efficiency, reduce changes in the shape or physical properties of the liner in a tire vulcanizing process or an automobile running process, and the like.

However, previously known methods have limitations in maintaining excellent air permeability and tire moldability while sufficiently reducing the thickness and weight of the inner liner. In addition, there were problems in that these methods use an additional rubber type of tie gum in order to rigidly bond a carcass layer in the inside of a tire and thus weight of the tire is increased and fuel efficiency of automobiles is lowered.

Further, the inner liner manufactured by the previously known methods had cracks generated and did not have sufficient fatigue resistance due to repeated deformations in the tire manufacturing process or in an automobile running process.

Accordingly, there is a need to develop a tire inner liner that can be easily coupled to a tire inner part while having a relatively thin thickness so that weight of the tire can be reduced, and that can not only endow physical properties such as an excellent gas barrier property and moldability but also have sufficient fatigue resistance which can withstand repeated deformations.

DETAILED DESCRIPTION OF THE INVENTION

Technical Objectives

It is an object to provide a polymer film which endows an excellent gas barrier property even to tires having a relatively thin thickness so that weight of the tire can be reduced when it is used for an inner liner film, improves fuel efficiency of automobiles, and has excellent mechanical physical properties such as high durability and fatigue resistance together with excellent moldability.

Technical Solutions

There is provided a polymer film which includes: a base film layer including a polyamide-based resin, and a copolymer containing a polyamide-based segment and a polyether-based segment; and an adhesive layer, formed on at least one side of the base film layer, containing a resorcinol-formalin-latex (RFL)-based adhesive, wherein the content of the polyether-based segment of the copolymer is more than 2% by weight and less than 15% by weight with respect to the total weight of the base film layer, and wherein the base film layer has an absolute weight average molecular weight of 50,000 to 1,000,000.

The polymer film according to specific embodiments will now be described in more detail.

The present inventors conducted extensive research and found that, when using the base film layer having an absolute weight average molecular weight of 50,000 to 1,000,000 formed by using a copolymer containing a polyether-based segment in a specific amount together with the polyamide-based resin, it can endow an excellent gas barrier property even to tires having a relatively thin thickness so that weight of the tire can be reduced, improve fuel efficiency of automobiles, and has mechanical properties such as high durability and fatigue resistance together with excellent moldability while having high heat resistance.

In particular, it was found that when an adhesive layer containing a resorcinol-formalin-latex (RFL)-based adhesive is formed on the base film layer, it can be firmly coupled to the tire, even without applying an additional vulcanization process or significantly increasing the thickness of the adhesive layer.

The polymer film according to one embodiment can be used for a tire inner liner.

In particular, the base film layer may have an absolute weight average molecular weight of 50,000 to 1,000,000, and preferably 80,000 to 900,000. Therefore, the base film layer may have a low modulus together with sufficient strength, and the degree of crystallinity thereof is not significantly increased when heated at a high temperature of 100° C. or more and thus modulus, elasticity, or elastic recovery are not significantly lowered, thereby having excellent moldability.

Moreover, the tire to which the polymer film including the base film layer is applied may have mechanical physical properties such as high durability and fatigue resistance.

In particular, when using the Wyatt's MALS (Multi Angle Light Scattering) system, the absolute weight average molecular weight of the polymer material can be obtained by applying the parameters shown in the measurement result to the Rayleigh-Gans-Debye equation.

$$K^*C/R(\theta)=1/MP(\theta)+2A_2C \quad \text{<Equation 1: Rayleigh-Gans-Debye equation>}$$

The polymer material causes polarization of a charge according to interaction with light, and the polarized charges cause light to be spread in all directions. The above Equation 1 is drawn from a principle in which charge transfer quantities and radiant quantities of light depend on polarizability of the polymer material.

In other words, the molar mass and size of the polymer can be determined from angular variation and the amount of scattered light that are evaluated by irradiating laser light to the solution containing solvent and any polymer material.

In the Equation 1, M is a molar mass, and in the case of polydispersed samples, is an absolute weight average molecular weight (Mw), $R(\theta)$ is the excess Rayleigh ratio, $K^*=4\pi^2 n_0^2(dn/dc)^2 \lambda_0^{-4} N_A^{-1}$, C is a polymer concentration in solution (g/ml), and $A_2$ is the second virial coefficient.

Also, in the above $K^*$, $n_0$ is a refractive index of a solvent, $N_A$ is Avogadro's number, $\lambda_0$ is a wavelength of light in vacuum, $P(\theta)=R(\theta)R_0$, and $R_0$ is incident light.

Further, dn/dc is a specific refractive index increment, which means a change rate of the refractive index (dn) according to the concentration change (dc) of the dilute solution obtained by dissolving a specific polymer material with an organic solvent. The above refractive index can be obtained by injecting a dilute solution into a flow cell of a differential refractometer, and the specific refractive index increment (dn/dc) can be obtained by measuring a change rate of the reflective index in sections on a constant concentration.

According to the Equation 1, the intensity of scattered light is proportional to a molecular weight and a concentration, thereby the absolute weight average molecular weight of the polymer material can be obtained by measuring the intensity and concentration of the scattered light through a MALS system.

The absolute weight average molecular weight is involved with the processability, moldability, or melt viscosity and the like of a molded article such as a film manufactured using a polymer material. Accordingly, as the base film layer has the absolute weight average molecular weight of 50,000 to 1,000,000 and preferably 80,000 to 900,000, the strength and elongation at break of the polymer film can be improved, the modulus is lowered, and the moldability, elasticity, or elastic recovery and the like can be improved.

Further, as the base film layer has an absolute weight average molecular weight within the above-mentioned range, the polymer film may endow a high gas barrier property even to tires having a relatively thin thickness.

If the absolute weight average molecular weight of the base film layer is less than 50,000, the polymer film lacks the strength, elongation at break, or toughness and the like, and thus it cannot have minimum mechanical physical properties and moldability required for a tire manufacturing process. Further, the manufactured tire fails to have a sufficient gas barrier property, durability, and fatigue resistance and thus defects such as breakage or cracks can be generated in an automobile running process.

Further, if the absolute weight average molecular weight of the base film layer exceeds 1,000,000, the modulus of the base film layer is greatly increased and the discharge pressure due to a high viscosity during its processing is increased. Thus, it is difficult to control the thickness uniformly, process efficiency and productivity are lowered, and also sufficient moldability cannot be secured in a tire molding process. Further, a modulus difference between rubber of the tire and an inner liner increases. Hence, in an automobile running process and the like, stress is concentrated in the inner liner or heat is generated, thereby leading to a decrease in the physical properties such as durability of the tire.

Meanwhile, in the above polymer film, a specific refraction increment (dn/dc) of the base film as measured at 40° C. using a 1:4 mixed solvent of m-cresol and chloroform containing tetramethylammonium chloride at a concentration of 0.02 M may be 0.04 mL/g to 0.14 mL/g, and preferably 0.05 mL/g to 0.13 mL/g.

The specific refractive index increment (dn/dc) refers to a change rate of the refractive index (dn) according to a concentration change of a dilute solution (dc) obtained by dissolving a specific polymer material in an organic solvent.

The above refractive index can be obtained by injecting a dilute solution into a flow cell of a differential refractometer, and the specific refractive index increment (dn/dc) can be obtained by measuring a change rate of the reflective index in sections on a constant concentration.

The specific refractive index increment (dn/dc) is a value determined by a refractive index difference between a polymer material and an organic solvent and by a size of a polymer material, which is an absolute intrinsic value of the polymeric material In the solution containing a polymer material, light scattering is caused by a chain of the polymer material. This is because the size of the polymer chain is smaller than or similar to the wavelength of the light and the polymer chains are polarized by the electric field of incident light.

In the case of light scattering, if there exists a same amount of scatterer without being proportional to the amount of the material that causes the scattering, the scattering due to large particles is very much stronger than scattering due to small particles.

Therefore, the degree of light scattering is affected by the size of the particles, and thus the information about unique characteristics of the polymer material such as molecular weight can be obtained by using the degree of light scattering.

More specifically, the polymer material causes polarization of a charge according to the interaction with light, and the polarized charges cause light to be spread in all directions. Using a principle in which charge transfer quantities and radiant quantities of light depend on polarizability of the polymer material, the characteristics such as the molar mass and size of the polymer can be determined from angular variation and the amount of scattered light that are evaluated by irradiating laser light to the solution containing a solvent and any polymer material.

In particular, since the polymer material under a specific temperature and a dilute solution has a certain change rate of the refractive index in a constant concentration change section, a specific refractive index increment (dn/dc) is an absolute intrinsic value of the polymeric material.

The 1:4 mixed solvent of m-cresol and chloroform containing tetramethylammonium chloride at a concentration of 0.02 M refers to a solution prepared to have a concentration of 0.02 M by adding tetramethylammonium chloride to a 1:4 mixed solvent of an m-cresol solution and a chloroform solution having a concentration of 99% or more (substantially 100%), respectively.

The specific refractive index increment (dn/dc) of the base film as measured using the above-described conditions and solutions may be 0.04 mug to 0.14 mL/g, and preferably 0.05 mug to 0.13 mL/g.

As above, as the base film exhibits the above-mentioned specific refractive index increment (dn/dc), the polymer film may have excellent physical properties or characteristics such as a low modulus and high elastic recovery.

In addition, the base film can endow an excellent gas barrier property even to tires having a relatively thin thickness as compared with previously known inner liner film, for example a film with a butyl rubber. Therefore, the fuel efficiency can be improved due to a weight reduction, and high speed driving performance and fuel efficiency of automobiles can be improved due to a reduction in the rotational resistance.

If a specific refractive index increment (dn/dc) of the base film layer is less than 0.04 mL/g, oxygen permeability is not good and the modulus due to elongation can be increased. Further, if the specific refractive index increment (dn/dc) exceeds 0.14 mL/g, the elastic recovery is low and thus the film can be damaged upon deformation of the tire.

On the other hand, the base film layer may have a thickness of 30 μm to 300 μm, preferably 40 μm to 250 μm, and more preferably 40 μm to 200 μm.

Thus, the polymer film according to an embodiment may have low air permeability, for example oxygen permeability of 200 cc/(m$^2$·24 h·atm) or less while having a thin thickness as compared with a previously known one.

Specifically, the characteristic of the above-described polymer film is that the base film layer is prepared using a copolymer containing a specific content of polyether-based segments and polyamide-based segments together with the polyamide-based resin.

Alternatively, the polyamide-based resin that is used may have a relative viscosity (96% sulfuric acid solution) of 3.0 to 3.5, and preferably 3.2 to 3.4.

If the viscosity of the polyamide-based resin is less than 3.0, sufficient elongation may not be obtained due to a decrease in toughness, and thus damage may be generated in a tire manufacturing process or in an automobile running process, and it may be difficult for the base film layer to secure physical properties such as a gas barrier property, moldability, and the like required for an inner liner film.

Further, if the viscosity of the polyamide-based resin exceeds 3.5, the modulus or viscosity of the base film layer to be manufactured may be unnecessarily high, and it may be difficult for a tire inner liner to have proper moldability or elasticity.

The relative viscosity of the polyamide-based resin refers to a relative viscosity measured using a 96% sulfuric acid solution at room temperature.

Specifically, a specimen of a certain polyamide-based resin (for example, a 0.025 g specimen) is dissolved in a 96% sulfuric acid solution at various concentrations to prepare two or more measurement solutions (for example, a polyamide-based resin specimen is dissolved in 96% sulfuric acid at concentrations of 0.25 g/dL, 0.10 g/dL, and 0.05 g/dL to prepare three measurement solutions), and then the relative viscosity of the measurement solutions (for example, the ratio of the average passing time of the measurement solutions to the passing time of the 96% sulfuric acid solution through a viscosity tube) may be obtained using a viscosity tube at 25° C.

The polyamide-based resin which can be used in the base film layer includes, for example, nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS; or an N-alkoxy alkylate thereof, for example, a methoxy methylate of 6-nylon, a methoxy methylate of 6-610-nylon, or a methoxy methylate of 612-nylon, and nylon 6, nylon 66, nylon 46, nylon 11, nylon 12, nylon 610, or nylon 612 may be preferably used.

Further, the polyamide-based resin may be included in the base film layer by preparing the base film using the method using the resin itself as well as using a monomer of the polyamide-based resin or a precursor of the polyamide-based resin.

As described above, the copolymer containing polyamide-based segments and polyether-based segments is present in a state of being bonded or distributed between the polyamide-based resins, and thus they can further lower the modulus of the base film layer, inhibit an increase in the stiffness of the base film layer, and prevent the base film layer from being crystallized at a high temperature.

By including such a copolymer in the base film layer, the polymer film can achieve high elasticity or elastic recovery even while securing mechanical properties such as excellent durability, heat resistance, fatigue resistance, and the like.

Therefore, the polymer film can exhibit excellent moldability, and the tire to which it is applied may not be physically damaged or have its own physical properties or performance lowered in an automobile running process during which repeated deformation and high heat are continuously generated.

Meanwhile, when the content of the polyether-based segments of the copolymer is more than 2% by weight and less than 15% by weight, preferably 3% to 14% by weight, and more preferably 5% to 13% by weight, based on the total weight of the base film layer, the polymer film can exhibit excellent physical properties and performance.

When the content of the polyether-based segments is excessively lowered in the overall base film layer, the modulus of the base film layer or polymer film is increased and thus the moldability of the tire is lowered, or the physical properties due to repeated deformation may be greatly lowered.

When the content of the polyether-based segments is excessively increased in the overall base film layer, the gas barrier property required for a tire inner liner is not good and thus the performance of the tire may be lowered, the reactivity to the adhesive is reduced, and thus it may be difficult for an inner liner to easily bond to a carcass layer. In addition, the elasticity of the base film layer is increased and thus manufacture of the uniform film may not be easy.

The polyamide-based segment may include a repeating unit of the following Chemical Formula 1 or Chemical Formula 2.

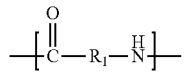
[Chemical Formula 1]

In Chemical Formula 1, $R_1$ is a linear or branched alkylene group having 1 to 20 carbon atoms, an arylene group having 6 to 20 carbon atoms, or a linear or branched arylalkylene group having 7 to 20 carbon atoms.

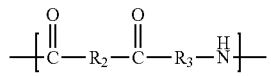
[Chemical Formula 2]

In Chemical Formula 2, $R_2$ is a linear or branched alkylene group having 1 to 20 carbon atoms, and $R_3$ is a linear or branched alkylene group having 1 to 20 carbon atoms, an arylene group having 6 to 20 carbon atoms, or a linear or branched arylalkylene group having 7 to 20 carbon atoms.

Further, the polyether-based segment of the copolymer may include a repeating unit of the following Chemical Formula 3.

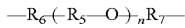
[Chemical Formula 3]

In Chemical Formula 3, $R_5$ is a linear or branched alkylene group having 1 to 10 carbon atoms, n is an integer of 1 to 100, and $R_6$ and $R_7$ may be identical or different and are independently a direct bond, —O—, —NH—, —COO—, or —CONH—.

The absolute weight average molecular weight of the copolymer containing polyamide-based segments and polyether-based segments may be 50,000 to 1,000,000, and preferably 80,000 to 900,000.

If the absolute weight average molecular weight of the copolymer is less than 50,000, the manufactured base film layer lacks the mechanical physical properties to be used for an inner liner film, and it is difficult for the polymer film to have sufficient gas barrier property.

Also, if the absolute weight average molecular weight of the copolymer exceeds 1,000,000, the modulus or the degree of crystallinity of the base film layer are excessively increased when heated at a high temperature, and thus it may be difficult to secure the elasticity or elastic recovery required for the inner liner film.

Meanwhile, when the polyether-based segment is within the range of more than 2% by weight and less than 15% by weight based on the total weight of the film, the above-described copolymer may include the polyamide-based segment and the polyether-based segment in a weight ratio of 1:9 to 9:1.

As described above, if the content of the polyether-based segment is too small, the modulus of the base film layer or the polymer film becomes high and thus the moldability of the tire is reduced or the physical properties may be greatly decreased due to repeated deformations.

Further, if the content of the polyether-based segment is too large, the gas barrier property of the polymer film can be lowered, and the reactivity to the adhesive is lowered and thus it may be difficult for the inner liner to adhere easily to a carcass layer. Further, the elasticity of the base film layer is increased and thus it may not be easy to manufacture a uniform film.

In addition, in the base film layer, the polyamide-based resin and the copolymer can be included in a weight ratio of 6:4 to 3:7, and preferably 5:5 to 4:6.

If the content of the polyamide-based resin is too small, the density or gas barrier property of the base film layer can be lowered.

Also, if the content of the polyamide-based resin is too large, the modulus of the base film layer may become excessively high or the moldability of the tire may be reduced. Further, in the tire manufacturing process or in the automobile running process, the polyamide-based resin can be crystallized under a high temperature environment, and cracks can be generated due to repeated deformations.

On the other hand, the base film layer may further include an olefinic polymer compound.

The above-described base film layer uses the olefinic polymer compound together with the polyamide-based resin and the copolymer containing polyamide-based segments and polyether-based segments, and thereby it is possible to prevent a phenomenon in which the polymer film according to one embodiment is crystallized due to high temperature or external impact or deformation and the like. Further, while maintaining other mechanical physical properties of the polymer film according to one embodiment to the equivalent or higher level, the modulus is lowered or the elasticity is increased, thus improving fatigue resistance and durability.

Specifically, the olefinic polymer compound serves to improve the ability to increase softness of the base film layer and absorb the impact applied from the outside. Also, the olefinic polymer compound can greatly lower the modulus of the base film layer and also prevent a phenomenon in which the inner structure of the compound or polymer included in the base film layer from is changed and crystallized.

The above-described base film layer can include 0.1% by weight to 40% by weight, or 1% by weight to 30% by weight, or 2% by weight to 25% by weight of the olefinic polymer compound.

If the content of the olefinic polymer compound is too small, the functional effect due to the use of the olefinic polymer compound may be slight.

If the content of the olefinic polymer compound is too large, the physical property or effect resulting from the polyamide-based resin and the copolymer can be lowered. Also, by applying the polymer film according to one embodiment to the inner liner film, the moldability in the tire manufacturing process may be lowered.

As the base film layer includes the olefinic polymer compound, even without significantly increasing the content of the polyether-based segments of the copolymer, for example, even if the base film includes the polyether-based segment of the copolymer in an amount of more than 2% by weight and less than 15% by weight, it is possible to provide a polymer film or inner liner film that is capable of achieving high elasticity, durability, and fatigue resistance for a long period of time.

The olefinic polymer compound may contain an olefinic polymer, an olefinic copolymer, a dicarboxylic acid or its acid anhydride-grafted olefinic polymer or copolymer, or a mixture of two or more of these.

The olefinic polymer may include polyethylene, polypropylene, or a mixture thereof.

The olefinic polymer may include an ethylene-propylene copolymer.

As described above, the above-mentioned olefinic polymer compound may include an olefinic polymer or copolymer grafted with a dicarboxylic acid or its acid anhydride, wherein the above dicarboxylic acid can include maleic acid, phthalic acid, itaconic acid, citraconic acid, alkenylsuccinic acid, cis-1,2,3,6-tetrahydrophthalic acid, 4-methyl-1,2,3,6-tetrahydro phthalic acid, or a mixture of two or more of these, and the dianhydrides of the above dicaroxylic acids may be a dicarboxylic acid dianhydride in the example described above.

Among the olefinic polymer or copolymer grafted with a dicarboxylic acid or its acid anhydride, the grafted dicarboxylic acid or its acid anhydride may be contained in an amount of more than 0.05% by weight, and preferably from 0.1% to 50% by weight, or 0.1% to 10% by weight.

The grafting rate of this dicarboxylic acid or its acid anhydride can be determined from the results obtained by titrating the olefinic polymer compound with an acid-base.

For example, about 1 g of the olefinic polymer compound is put in 150 ml of xylene saturated with water and refluxed for 2 h to which a 1 wt % thymol blue-dimethylformamide solution is added in a small amount and then subjected to somewhat excessive titration with a 0.05 N sodium hydroxide-ethyl alcohol solution to thereby obtain a dark blue solution. Then, the resulting solution is subjected to back titration with a 0.05 N hydrochloric acid-isopropyl alcohol solution until it shows yellow, thereby obtaining an acid number. From this acid number, the amount of the dicarboxylic acid grafted on the olefinic polymer compound can be calculated.

The olefinic polymer compound may have a density of 0.820 g/cm$^3$ to 0.960 g/cm$^3$, or 0.840 g/cm$^3$ to 0.920 g/cm$^3$.

Meanwhile, the base film layer may be an undrawn film.

When the base film layer is in the form of the undrawn film, it has a low modulus and high strain and thus it can be suitably applied to a tire molding process during in which high expansion occurs.

Also, in the undrawn film, the crystallization phenomenon hardly occurs and thus it is possible to prevent damage such as cracks due to repeated deformations.

Moreover, in the undrawn film, since orientation in a particular direction and deviation in the physical properties are not large, an inner liner having a uniform physical property can be obtained.

As shown in the manufacturing process of the polymer film to be described later, the base film can be manufactured into a non-oriented or undrawn film by a method of suppressing the orientation of the base film layer to the utmost, for example, by adjusting viscosity through the optimization of the melt and extrusion temperature, by changing a nozzle die standard (size), or by controlling a winding speed.

When applying the undrawn film to the base film layer, the film for the inner liner can be easily manufactured in a cylindrical shape or a sheet shape in the tire manufacturing process.

In particular, when applying the undrawn film to the base film layer, it is preferred in that it is not necessary to separately construct a film production facility for each tire size and that impact or wrinkles applied to the film in the transport and storage processes can be minimized.

Further, when manufacturing the base film in sheet form, a step of adding a adhesive layer to be described later can be more easily conducted. Due to the molding drum and standard difference, it is possible to prevent damage or distortion occurring in the manufacturing process.

On the other hand, the base film may further include additives such as additives such as a heat-resistant antioxidant, a thermal stabilizer, an adhesion promoter, or a mixture thereof.

Specific examples of the heat-resistant antioxidant include N,N'-hexamethylene-bis-(3,5-di-tert-butyl-4-hydroxy-hydrocinnamide (e.g., commercially available products such as Irganox 1098), tetrakis[methylene(3,5-di-(t-butyl)-4-hydroxy-hydrocinnamate)]methane (e.g., commercially available products such as Irganox 1010), or 4,4'-di-cumyl-di-phenylamine (e.g., Naugard 445), and the like.

Specific examples of the thermal stabilizer include benzoic acid, triacetonediamine, N,N'-bis(2,2,6,6-tetramethyl-4-piperidyl)-1,3-benzenedicarboxamide, and the like.

However, the additives are not limited to the above examples, and those known to be usable in the polymer film may be used without any specific limitation.

On the other hand, the adhesive layer including the resorcinol-formalin-latex (RFL)-based adhesive has excellent adhesion force and adhesion maintaining performance to the base film layer and a tire carcass layer, and thus it may prevent breaking of the interface between an inner liner film and a carcass layer, which is generated by heat or repeated deformation in a tire manufacturing process or an automobile running process, to impart sufficient fatigue resistance to the polymer film.

It is considered that the main properties of the adhesive layer result from the inclusion of the resorcinol-formalin-latex (RFL)-based adhesive having a specific composition.

Previously, as an adhesive for a tire inner liner, a rubber type of tie gum and the like was used, and thus an additional vulcanization process was required.

On the contrary, since the adhesive layer includes the resorcinol-formalin-latex (RFL)-based adhesive having a specific composition, it has high reactivity and adhesion force to the base film, and it may be compressed under a high temperature heating condition to firmly adhere the base film to a carcass layer without significantly increasing the thickness. Thus, the weight of a tire may become lighter, the fuel efficiency of automobiles may be improved, and separation between a carcass layer and an inner liner or between the base film and the adhesive layer may be prevented even if deformations occur repeatedly in a tire manufacturing process or in an automobile running process.

Further, since the adhesive layer may exhibit high fatigue resistance to physical/chemical deformations that may occur in a tire manufacturing process or an automobile running process, it may minimize lowering of adhesion force or other physical properties in a manufacturing process under high temperature conditions or in an automobile running process during which mechanical deformation is applied for a long time.

Furthermore, the resorcinol-formalin-latex (RFL)-based adhesive may exhibit good adhesion performance since cross-linkage between latex and rubber is available. The resorcinol-formalin-latex (RFL)-based adhesive is physically a latex polymer and thus has a flexible property like rubber due to low hardness, and a methylol group of the resorcinol-formalin-latex polymer and a base film may be chemically bonded.

Thus, if the resorcinol-formalin-latex (RFL)-based adhesive is applied to a base film, the film having sufficient adhesion performance may be provided.

The resorcinol-formalin-latex (RFL)-based adhesive may include 2% to 32% by weight, preferably 10% to 20% by weight of a condensate of resorcinol and formaldehyde, and 68% to 98% by weight, preferably 80% to 90% by weight of a latex.

The condensate of resorcinol and formaldehyde may be obtained by mixing resorcinol and formaldehyde at a mole ratio of 1:0.3 to 1:3.0, preferably 1:0.5 to 1:2.5, and conducting condensation.

Further, the condensate of resorcinol and formaldehyde may be included in the amount of 2% by weight or more based on the total weight of the adhesive layer in terms of a chemical reaction for excellent adhesion, and it may be included in the amount of 32% by weight or less so as to secure adequate fatigue resistance.

The latex may be selected from the group consisting of natural rubber latex, styrene/butadiene rubber latex, acrylonitrile/butadiene rubber latex, chloroprene rubber latex, and styrene/butadiene/vinylpyridine rubber latex, and a mixture of two or more thereof.

The latex may be included in the amount of 68% by weight or more based on the total weight of the adhesive layer for softness and an effective cross-linking reaction with rubber, and it may be included in the amount of 98% by weight or less for a chemical reaction with the base film and stiffness of the adhesive layer.

Further, the adhesive layer may further include at least one additive such as a surface tension control agent, a heat resistant agent, an antifoaming agent, a filler, and the like, in addition to the condensate of resorcinol and formaldehyde.

At this time, the surface tension control agent is applied for uniform coating of the adhesive layer, but it may cause a decrease in adhesion when introduced in an excessive amount, and thus it may be included in the amount of 2% by weight or less, or 0.0001% to 2% by weight, preferably 1.0% by weight or less, or 0.0001% to 0.5% by weight, based on the total weight of the adhesive layer.

At this time, the surface tension control agent may be one or more selected from the group consisting of a sulfonic acid salt anionic surfactant, a sulfate ester anionic surfactant, a carboxylic acid salt anionic surfactant, a phosphate ester anionic surfactant, a fluorine-based surfactant, a silicone-based surfactant, and a polysiloxane-based surfactant.

The adhesive layer may have a thickness of 0.1 μm to 20 μm, preferably 0.1 μm to 10 μm, more preferably 0.2 μm to 7 μm, and still more preferably 0.3 μm to 5 μm, and it may be formed on one side or both sides of a film for a tire inner liner.

If the thickness of the adhesive layer is too thin, the adhesive layer itself may become thinner when a tire is inflated, cross-linking adhesion between a carcass layer and a base film may be lowered, and stress may be concentrated on a part of the adhesive layer to lower the fatigue resistance property.

Also, if the thickness of the adhesive layer is too thick, interface separation may occur in the adhesive layer to lower the fatigue resistance property.

In order to adhere the inner liner film to a carcass layer of a tire, an adhesive layer is generally formed on one side of the base film, but in the case where a multi-layered inner liner film is applied, or adhesion to rubber on both sides is required according to a tire molding method and construction design, for example when an inner liner film covers a bead part, the adhesive layer may be preferably formed on both sides of the base film.

Also, the polymer film can maintain a proper inflation pressure even after it is used for a long period of time. For example, when 90-day internal pressure retention (IPR) of the tire applied to the polymer film is measured at a temperature of 21° C. under a pressure of 101.3 kPa in accordance with the method of the American Society for Testing and Materials standard ASTM F 1112-06, the internal pressure retention may be 95% or more, that is, the internal pressure reduction may be 5% or less, as shown in Equation 2 below.

In this way, when using the above polymer film, a rollover accident or a fuel efficiency degradation caused by a low inflation pressure can be prevented.

Internal Pressure Retention (%)={1−(Tire inflation pressure upon initial testing−Tire inflation pressure after having been left for 90 days)/(Tie inflation pressure upon initial testing)}×100    [Equation 2]

On the other hand, the polymer film may have an adhesion force of 15 to 40 kgf with respect to the tire carcass layer.

This adhesion force can be measured by the method of ASTM D 4394.

Further, the standard deviation of the adhesion force to the tire carcass layer of the polymer film is not more than 5 and preferably not more than 3.

Thus, the polymer film can be uniformly and firmly adhered to the tire carcass layer.

The tire carcass layer (or body ply) is a backbone of the tire to support the load of the vehicle body, and means a structure in which a tire cord is included in the inside of a certain rubber component. In general, the rubber component of a tire carcass layer is coupled with the tire inner liner.

The rubber components used in the carcass layer can include conventionally known materials without any limitation. For example, it may include a synthetic rubber or natural rubber in an amount of at least 30% by weight, and various other additives and the like can be included.

As the tire cord included in the carcass layer, various natural fibers or rayon-nylon-polyester and Kevlar or the like can be used. Further, steel cords in which wires are twisted (steel cord) together can be used.

Details of the method for manufacturing the polymer film according to one embodiment described above are as follows.

In order to specify the absolute weight average molecular weight of the manufactured base film layer as 50,000 to 1,000,000, it is possible to adjust a relative viscosity or an absolute weight average molecular weight of the polyamide-based resin, to adjust a composition or an absolute weight average molecular weight of the copolymer, to adjust a mixing ratio of the polyamide-based resin and the copolymer, or to properly adjust a melting temperature or a melting time of the composition.

In the step of forming the base film layer, in order to extrude the film having a more uniform thickness, the copolymer and the polyamide-based resin can be adjusted to have a uniform size.

Thus, by adjusting the size of the copolymer and the polyamide-based resin, the copolymer and the polyamide-based resin can be more uniformly mixed in the step of mixing them, the step of staying in the raw material feeder which is maintained at a constant temperature, or the step of melting or extrusion and the like. It is thereby possible to prevent a phenomenon in which the copolymer and the polyamide-based resin are agglomerated alone or together and thus the size is increased. By doing so, the base film layer having a more uniform thickness may be formed.

When the copolymer and the polyamide-based resin have a similar size, it is possible to minimize a phenomenon in which raw chips are agglomerated together or uneven shapes or areas appear in the subsequent steps of mixing, melting, or extrusion. Thus, it is possible to form the base film having a uniform thickness over the entire area of the film.

The size of the copolymer and the polyamide-based resin that can be used in the above manufacturing method is not particularly limited.

On the other hand, the manufacturing method of the polymer film may further include a step of mixing the polyamide-based resin and the copolymer in a weight ratio of 6:4 to 3:7.

If the content of the polyamide-based resin is too small, the density or gas barrier property of the base film layer can be lowered.

Further, if the content of the polyamide-based resin is too large, the modulus of the base film layer may become excessively high or the moldability of the tire may be reduced. Also, in the tire manufacturing process or in the automobile running process, the polyamide-based resin can be crystallized under a high temperature environment, and cracks can be generated due to repeated deformations.

In this mixing step, any apparatus or method known to be usable in the mixing of the polymer film may be used without any limitation.

The polyamide-based resin and the copolymer can be mixed and then injected in a raw material feeder, and they may be successively or simultaneously injected into the raw material feeder and then mixed.

As described above, the above-described copolymer can include a polyamide-based segment and a polyether-based segment in a weight ratio of 1:9 to 9:1.

The composition of the polyamide-based resin and the copolymer may be fed into the extrusion die by way of the raw material feeder which is maintained at a temperature of 50° C. to 100° C.

As the raw material feeder is maintained at a temperature of 50° C. to 100° C., the composition of the polyamide-based resin and the copolymer can have the physical properties such as appropriate viscosity and thus can be moved easily to the extrusion die or other parts of the extruder. Moreover, it is possible to prevent a phenomenon of raw material feeding failure caused by agglomeration of the composition and the like. Further, in subsequent melting and extruding processes, a more uniform base film can be formed.

The raw material feeder is a part which serves to feed the raw material injected in an extruder or an extrusion die or other part, and its construction is not particularly limited. This raw material feeder may be a conventional raw material feeder which is included in an extruder for the production of a polymer resin.

On the other hand, the composition supplied to an extrusion die through the raw material feeder can be melted and extruded at a temperature of 230° C. to 300° C., thereby forming a base film layer.

The temperature for melting the composition may be 230° C. to 300° C. and preferably 240° C. to 280° C.

The melting temperature should be higher than the melting point of the polyamide-based compound. However, if the melting temperature is too high, carbonization or decomposition can occur to decrease the physical properties of the film. Also, coupling between the polyether-based resins or orientation in a fiber arrangement direction may occur and thus it may be disadvantageous to prepare an undrawn film.

Any extrusion die known to be usable for extrusion of a polymer resin may be used without specific limitation, but it is preferable to use a T-type die so as to make the thickness of the base film uniform or prevent occurrence of the orientation in the base film.

Meanwhile, the step of forming a base film layer may further include a step of extruding a composition of the polyamide-based resin and the copolymer containing polyamide-based segments and polyether-based segments as a film having a thickness of 30 μm to 300 μm.

Adjustment of the thickness of the manufactured film can be conducted by changing the extrusion conditions, for example, by adjusting the discharge amount of the extruder or the gap of the extrusion die, or by changing the winding speed in the cooling process or recovery process of the extrudate.

In order to more uniformly adjust the thickness of the base film layer in the range of 30 μm to 300 μm, the die gap of the extrusion die may be adjusted to 0.3 mm to 1.5 mm.

In the step of forming the base film, if the die gap is too small, the shear pressure of the extrusion die in the melting and extrusion processes becomes too high and its shear stress becomes high. Therefore, there may be problems in that it is difficult to make a uniform form of the film extruded and also that productivity is lowered. Further, if the die gap is too large, drawing of the melt-extruded film becomes excessively high and thus orientation may occur, and a difference in the physical properties between the vertical and horizontal directions of the base film to be manufactured may be increased.

Furthermore, in the method for manufacturing the polymer film, the thickness of the base film manufactured by the above-mentioned steps is continuously measured, and the measurement result is fed back to control the part of the extrusion die corresponding to the position where non-uniform thickness appears, for example, a lip gap adjustment bolt of a T-die, thus reducing deviation of the manufactured base film, thereby obtaining a film having more uniform thickness.

The measurement of the film thickness-feed back-control of the extrusion die may constitute an automated process step by using an automated system, for example the Auto Die system, and the like.

The composition of the polyamide-based segments and the copolymer containing polyamide-based segments and polyether-based segments may further include the above-described olefinic polymer compound.

Details of the olefinic polymer compound are as described above.

Meanwhile, the method for manufacturing the polymer film may further include a step of solidifying the base film layer formed through melting and extrusion in a cooling part maintained at a temperature of 5° C. to 40° C. and preferably 10° C. to 30° C.

By solidifying the base film layer formed through melting and extrusion in a cooling part maintained at a temperature of 5° C. to 40° C., a film having a more uniform thickness may be provided.

If the base film layer formed through melting and extrusion is folded and adhered to a cooling part maintained at the appropriate temperature, orientation may not substantially occur, and the base film layer may be provided as an undrawn film.

Specifically, the solidifying step may include a step of uniformly adhering the base film formed through melting and extrusion to a cooling roll maintained at a temperature of 5° C. to 40° C., using an air knife, an air nozzle, an electrostatic charging device (pinning device), or a combination thereof.

In the solidifying step, by adhering the base film formed through melting and extrusion to a cooling roll using an air knife, an air nozzle, an electrostatic charging device (pinning device), or a combination thereof, blowing of the more uniform thickness may be formed, and areas having a relatively thick or thin thickness compared to the surrounding parts in the film may not be substantially formed.

Meanwhile, the melted material extruded under the specific die gap conditions may be attached or folded to a cooling roll installed at a horizontal distance of 10 mm to 150 mm, and preferably 20 mm to 120 mm, from the die outlet, to eliminate drawing and orientation.

The horizontal distance from the die outlet to the cooling roll may be a distance between the die outlet and a point where discharged melted material is folded to the cooling roll.

If the linear distance between the die outlet and a position where melted material is folded to the cooling roll is too small, it may interfere with the uniform flow of the melt-extruded resin film and thus the film can be unevenly cooled. If the distance is too large, the effect of suppressing the drawing of the film cannot be achieved.

In the step of forming the base film, except for the above-described steps and conditions, film extrusion conditions commonly used for manufacturing of a polymer film, for example, screw diameter, screw rotation speed, line speed, and the like may be appropriately selected.

The method for manufacturing the polymer film may further include a step of coating a resorcinol-formalin-latex (RFL)-based adhesive on at least one side of the base film.

The adhesive layer including the resorcinol-formalin-latex (RFL)-based adhesive can be formed by coating the resorcinol-formalin-latex (RFL)-based adhesive on one side of the base film layer. Alternatively, it can be formed by laminating an adhesive film containing the resorcinol-formalin-latex (RFL)-based adhesive on one side of the base film layer.

Preferably, the step of forming the adhesive layer may be performed by coating the resorcinol-formalin-latex (RFL)-based adhesive on one side or both sides of the above formed base film, and then drying it.

The formed adhesive layer may have a thickness of 0.1 µm to 20 µm, and preferably 0.1 µm to 10 µm.

The resorcinol-formalin-latex(RFL)-based adhesive may include 2% to 32% by weight of a condensate of resorcinol and formaldehyde, and 68% to 98% by weight, and preferably 80% to 90% by weight of latex.

More details of the resorcinol-formalin-latex (RFL)-based adhesive having the above specific composition are as described above.

Commonly used coating methods or apparatuses may be used to coat the adhesive without specific limitation, but knife coating, bar coating, gravure coating, spray coating, or immersion may be used.

However, knife coating, gravure coating, or bar coating may be preferable in terms of uniform coating of the adhesive.

After forming the adhesive layer on one side or both sides of the base film, drying and adhesive reaction may be simultaneously performed, but a heat treatment reaction step may be performed after undergoing a drying step in consideration of the reactivity of the adhesive, and the steps of forming the adhesive layer and drying and reacting it may be conducted several times for application of a thickness of the adhesive layer or a multi-layered adhesive.

After coating the adhesive on the base film, a heat treatment reaction may be conducted by the method of solidification and reaction at a temperature of 100° C. to 150° C. for approximately 30 s to 3 min.

In the step forming the copolymer or composition or in the step of melting or extruding the copolymer, adhesives such as a heat-resistance antioxidant or a thermal stabilizer can be further added.

Details of the additives are as described above.

Advantageous Effect of the Invention

As set forth above, there can be provided a polymer film which endows an excellent gas barrier property even to tires having a relatively thin thickness so that weight of the tire can be reduced when it is used for an inner liner film, improves fuel efficiency of automobiles, and has excellent mechanical properties such as high durability and fatigue resistance together with excellent moldability.

BRIEF DESCRIPTION OF THE DRAWINGS

FIG. 1 schematically shows the structure of a pneumatic tire.

DETAILED DESCRIPTION OF THE EMBODIMENTS

Specific embodiments of the invention will be explained in detail in the following examples. However, these examples are only to illustrate specific embodiments of the invention, and the scope of the invention is not limited thereto.

EXAMPLE

Manufacture of a Film for a Tire Inner Liner

Example 1

(1) Manufacturing of a Base Film

A polyamide-based resin (nylon 6) having a relative viscosity (96% sulfuric acid solution) of 3.3, a copolymer resin having an absolute weight average molecular weight of 145,000 (including 55% by weight of a polyamide-based repeating unit and 45% by weight of a polyether-based repeating unit) and maleic anhydride-grafted (0.7 wt %) ethylene-propylene copolymer (density: 0.870 g/cm$^3$) were mixed with a weight ratio of 4:4:2.

At this time, the raw material feeder was adjusted to a temperature of 50° C. to 100° C. and then the above mixture was supplied to an extrusion die, while preventing the mixture from being fused in an extruder screw and thus causing a feeding failure.

Then, the supplied mixture was extruded through a T-type die (die gap 1.0 mm) at a temperature of 260° C. while maintaining uniform flow of melted resin. The extruded melted resin was cooled and solidified into a film with a uniform thickness using an air knife on the surface of a cooling roll that was controlled to 25° C.

Subsequently, a undrawn base film having a thickness of 100 um was obtained without going through the drawing and heat treatment section at a speed of 15 m/min.

(2) Coating of Adhesive

Resorcinol and formaldehyde were mixed at a mole ratio of 1:2 and then subjected to a condensation reaction to obtain a condensate of resorcinol and formaldehyde.

12% by weight of the condensate of resorcinol and formaldehyde and 88% by weight of styrene/butadiene-1,3/ vinylpyridine latex were mixed to obtain a resorcinol-formalin-latex (RFL)-based adhesive with a concentration of 20%.

The resorcinol-formalin-latex (RFL)-based adhesive was coated on the base film to a thickness of 1 um using a gravure coater, and dried and reacted at 150° C. for 1 min to form an adhesive layer.

Example 2

(1) Manufacturing of a Base Film

The base film was manufactured in the same manner as in Example 1, except that a polyamide-based resin (nylon 6) having a relative viscosity (96% sulfuric acid solution) of 3.3, a copolymer resin having an absolute weight average molecular weight of 110,000 (including 40% by weight of a polyamide-based repeating unit and 60% by weight of a polyether-based repeating unit), and maleic anhydride-grafted (0.7 wt %) ethylene-propylene copolymer (density: 0.870 g/cm$^3$) were mixed with a weight ratio of 4:6:2.

(2) Coating of Adhesive

The adhesive layer was formed on the above manufactured base film in the same manner as in Example 1.

COMPARATIVE EXAMPLE

Manufacture of a Film for a Tire Inner Liner

Comparative Example 1

(1) Manufacturing of a Base Film

The base film was manufactured in the same manner as in Example 1, except that 60% by weight of a polyamide-based resin (nylon 6) having a relative viscosity (96% sulfuric acid solution) of 3.3 and 40% by weight of a copolymer resin having an absolute weight average molecular weight of 120,000 (including 80% by weight of a polyamide-based repeating unit and 20% by weight of a polyether-based repeating unit) were mixed.

(2) Coating of Adhesive

The adhesive layer was formed on the manufactured base film in the same manner as in Example 1.

Comparative Example 2

(1) Manufacturing of a Base Film

The base film was manufactured in the same manner as in Example 1, except that 20% by weight of a polyamide-based resin (nylon 6) having a relative viscosity (96% sulfuric acid solution) of 3.3 and 80% by weight of a copolymer resin having an absolute weight average molecular weight of 100,000 (including 20% by weight of a polyamide-based repeating unit and 80% by weight of a polyether-based repeating unit) were mixed.

(2) Coating of Adhesive

The adhesive layer was formed on the above manufactured base film in the same manner as in Example 1.

EXPERIMENTAL EXAMPLE

Measurement of Physical Properties of a Film for a Tire Inner Liner

Experimental Example 1

Measurement of the Absolute Weight Average Molecular Weight

In order to measure the absolute weight average molecular weight, 2.192 g of tetramethylammonium chloride was weighed and introduced in a 1 L volumetric flask to produce m-cresol/chloroform (1/4, V/V).

0.050 g of the base film obtained in the examples and comparative examples was completely dissolved by further adding 10 ml of 0.02 M-TMAC m-cresol/chloroform 1/4 (V/V).

Then, the solution in a state where the base film was completely dissolved was filtered with a 0.45 um syringe filter, and then mounted on the MALS autosampler.

In this case, specific measurement conditions were as follows.

(1) Specific measurement conditions injection volume: 100 ul injector temperature: 40° C.

flow rate: 1 ml/min

Eluent: m-cresol/chloroform 1/4 (V/V) (containing 0.02 mol of tetramethyl ammonium chloride)

(2) Measurement of dn/dc

The specific method for measuring the specific refractive index increment (dn/dc) is as follows.

To 1 L of the 1:4 mixed solvent of m-cresol and chloroform, 0.02 mol of tetramethylammonium chloride was added to prepare a solution.

To 100 ml of this mixed solvent, 2 g of the base film obtained in Examples 1 to 4 and Comparative Example 1 was added and completely dissolved. Then, foreign materials were removed by using a 0.45 um syringe filter.

The resulting high-concentration samples were diluted to prepare samples having concentrations of 0.02 g/ml, 0.010 g/ml, 0.005 g/ml, and 0.002 g/ml. The refractive index of these samples in response to the concentrations was measured by using 0.45 μm syringe filter.

(3) Analysis Method of dn/dc Sample injection volume: 0.9 ml injector temperature: 40° C.

flow rate: 0.3 ml/min eluent: m-Cresol+Chloroform (1:4) solvent (containing 0.02 mol of tetramethyl ammonium chloride)

TABLE 1

| Results of Experimental Example 1 Base Film | | |
|---|---|---|
| Classification | Absolute weight average molecular weight | dn/dc [mL/g] |
| Example 1 | 296,700 | 0.0842 |
| Example 2 | 762,400 | 0.0638 |
| Comparative Example 1 | 102,100 | 0.1410 |
| Comparative Example 2 | 1,102,100 | 0.0589 |

Experimental Example 2

Oxygen Permeability Test

The oxygen permeability of each film for a tire inner liner obtained in the examples and comparative examples was measured.

Specific measurement method thereof is as follows.

(1) Oxygen permeability: measured at 25° C. under a 60 RH % atmosphere using an Oxygen Permeation Analyzer (Model 8000, Illinois Instruments product) according to ASTM D 3895.

Experimental Example 3

Measurement of Internal Pressure Retention

The tire was manufactured using the tire inner liner films of the examples and comparative examples according to the standard 205R/65R16.

Then, 90-day internal pressure retention according to the following Equation 2 was measured at a temperature of 21° C. under a pressure of 101.3 kPa in accordance with ASTM F1112-06.

Internal Pressure Retention (%)={1−(Tire inflation pressure upon initial testing−Tire inflation pressure after having been left for 90 days)/(Tire inflation pressure upon initial testing)}×100    [Equation 2]

Experimental Example 4

Measurement of Modulus at Room Temperature

The room temperature modulus of the film for inner liner obtained in examples and comparative examples was measured without elongation of the film.

Then, the film for inner liner was subjected to 100% elongation at room temperature based on the MD (machine direction) thereof to measure the modulus.

Specific measurement method is as follows.

(1) Instrument—Universal Material Tester (Model 4204, Instron Co., Ltd.)

(2) Measurement conditions: 1) Head Speed 300 mm/min, 2) Grip Distance 100 mm, 3) Sample Width 10 mm, and 4) 25° C. and 60 RH % atmosphere (3) Each of measurements was conducted five times, respectively, and the average value thereof was obtained.

Experimental Example 5

Determination of the Ease of Molding

The tire was manufactured using the tire inner liner film of the examples and comparative examples according to the standard of 205R/65R16.

In a manufacturing process of a tire, a green tire was manufactured and then the manufacturing ease and appearance were evaluated. Then, after vulcanization, the final appearance of the tire was observed.

In this case, when there was no distortion in a green tire or a tire after vulcanization and a standard deviation of diameter was within 5%, it was evaluated as "good".

Also, when distortion was generated in a green tire or a tire after vulcanization and thus the tire was not properly made or the inner liner in the inside of the tire was melted or torn and broken or when a standard deviation of the diameter was greater than 5%, it was evaluated as "poor form".

TABLE 2

Results of Experimental Examples 4 and 5

| | Load at 100% elongation at room temperature (kgf)/Load per unit thickness at 100% elongation at room temperature (gf/um) | Manufacturing state of a green tire | Oxygen permeability cc/(m² · 24 h · atm) | 90-day internal pressure retention (%) |
|---|---|---|---|---|
| Example 1 | 1.26/16.4 | Good/good | 83 | 95.2 |
| Example 2 | 1.12/14.2 | Good/good | 95 | 93.4 |
| Comparative Example 1 | 4.12/42 | Bad form | 30.2 | — |
| Comparative Example 2 | 1.02/11.2 | Good/good | 625 | 87 |

As shown in Table 2 above, in the case of the examples, the base film layer having uniform physical prosperities in the entire area of the film can be formed. Further, the film for a tire inner liner of the examples using the base film layer has excellent moldability as well as a high gas barrier property and internal pressure retention performance.

DESCRIPTION OF REFERENCE NUMERALS

1: Tread
2: Shoulder
3: Sidewall
4: Cap ply
5: Belt
6: Body ply
7: Inner liner
8: Apex
9: Bead

What is claimed is:

1. A polymer film which comprises:
   a base film layer comprising a polyamide-based resin; an olefinic polymer compound; and a copolymer containing a polyamide-based segment and a polyether-based segment; and
   an adhesive layer formed on at least one side of the base film layer and containing a resorcinol-formalin-latex (RFL)-based adhesive,
   wherein the content of the polyether-based segment of the copolymer is more than 2% by weight and less than 15% by weight with respect to the total weight of the base film layer, and
   wherein the base film layer has an absolute weight average molecular weight of 50,000 to 1,000,000, and
   the olefinic polymer compound includes a dicarboxylic acid or its acid anhydride-grafted olefinic polymer or copolymer,
   wherein the polyamide-based resin, the copolymer, and the olefinic polymer compound, respectively are included in a weight ratio of 2:2:1 to 2:3:1 in the base film layer.

2. The polymer film of claim 1, wherein a specific refraction increment (dn/dc) of the base film as measured at 40° C. using a 1:4 mixed solvent of m-cresol and chloroform containing tetramethylammonium chloride at a concentration of 0.02 M is 0.04 mL/g to 0.14 mL/g.

3. The polymer film of claim 1, wherein the polymer film is used for a tire inner liner film.

4. The polymer film of claim 1, wherein the grafted dicarboxylic acid or its acid anhydride is contained in an amount of 0.1% to 10% by weight.

5. The polymer film of claim 1, wherein the base film layer includes the olefinic polymer compound in an amount of 0.1% to 40% by weight.

6. The polymer film of claim 1, wherein the polyamide-based resin has a relative viscosity with respect to 96% sulfuric acid solution of 3.0 to 3.5.

7. The polymer film of claim 1, wherein the copolymer containing polyamide-based segments and polyether-based segments has an absolute weight average molecular weight of 50,000 to 1,000,000.

8. The polymer film of claim 1, wherein the copolymer includes the polyamide-based segments and the polyether-based segments in a weight ratio of 1:9 to 9:1.

9. The polymer film of claim 1, wherein the base film layer has a thickness of 30 μm to 300 μm, and the adhesive layer has a thickness of 0.1 μm to 20 μm.

10. The polymer film of claim 1, wherein the base film layer is an undrawn film.

11. The polymer film of claim 1, wherein the resorcinol-formalin-latex (RFL)-based adhesive includes 2% to 30% by weight of a condensate of resorcinol and formaldehyde and 68% to 98% by weight of a latex.

* * * * *